(12) United States Patent
Dage et al.

(10) Patent No.: US 9,796,243 B2
(45) Date of Patent: Oct. 24, 2017

(54) COOLEST A/C DISCHARGE TEMPERATURE FOR ALL OPERATING CONDITIONS

(71) Applicants: Gary A. Dage, Franklin, MI (US); Steven L. Lambert, Washington, MI (US)

(72) Inventors: Gary A. Dage, Franklin, MI (US); Steven L. Lambert, Washington, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1294 days.

(21) Appl. No.: 13/759,228

(22) Filed: Feb. 5, 2013

(65) Prior Publication Data

US 2014/0216705 A1 Aug. 7, 2014

(51) Int. Cl.
*B60H 1/00* (2006.01)

(52) U.S. Cl.
CPC ..... *B60H 1/00878* (2013.01); *B60H 1/00771* (2013.01); *B60H 1/00828* (2013.01); *B60H 1/00849* (2013.01); *B60H 2001/00992* (2013.01)

(58) Field of Classification Search
CPC ............ B60H 1/00771; B60H 1/00785; B60H 1/00828; B60H 1/00849; B60H 1/00864; B60H 1/00878; B60H 1/321; B60H 2001/00992; B60H 2001/3245; B60H 2001/3264; B60H 2001/3272
USPC .................................. 165/202, 230, 231, 233
See application file for complete search history.

(56) References Cited

U.S. PATENT DOCUMENTS

| 4,350,021 A | * | 9/1982 | Lundstrom ............ F25D 21/04 62/150 |
| 4,424,682 A | | 1/1984 | Miska et al. |
| 4,742,689 A | | 5/1988 | Lowes |
| 4,930,698 A | * | 6/1990 | Takekawa .......... G05D 23/1902 165/43 |

(Continued)

FOREIGN PATENT DOCUMENTS

| CN | 101311638 A | 11/2008 |
| KR | 20050004363 A | 1/2005 |

OTHER PUBLICATIONS

English Translation of KR20050004363 (5 pages).

(Continued)

*Primary Examiner* — Travis Ruby
(74) *Attorney, Agent, or Firm* — Vichit Chea; Brooks Kushman P.C.

(57) ABSTRACT

An automatic climate controller device identifies an operating zone of the climate control system according to at least two input factors, and identifies a discharge temperature of the climate control system. Based on the operating zone and the discharge temperature, the automatic climate controller device determines whether to perform at least one override action to override a climate control system setting to reduce the possibility of evaporator core icing. The automatic climate controller device also adjusts an evaporator set point according to the at least one override action to reduce the discharge temperature. The input factors may include evaporator temperature and cabin relative humidity. The actions may include one or more of increasing blower speed or increasing use of recirculated air.

18 Claims, 4 Drawing Sheets

(56) References Cited

U.S. PATENT DOCUMENTS

| | | | | |
|---|---|---|---|---|
| 5,704,217 | A * | 1/1998 | Itoh | B60H 1/3207 |
| | | | | 236/49.3 |
| 6,067,808 | A | 5/2000 | Dage | |
| 6,260,363 | B1 | 7/2001 | Ye et al. | |
| 2008/0183334 | A1 * | 7/2008 | Greiner | B60H 1/00964 |
| | | | | 700/276 |
| 2009/0301111 | A1 * | 12/2009 | Heil | B60H 1/00785 |
| | | | | 62/91 |
| 2010/0031680 | A1 * | 2/2010 | Eisenhour | B60H 1/3207 |
| | | | | 62/176.1 |
| 2010/0190429 | A1 * | 7/2010 | Dage | B60H 1/00849 |
| | | | | 454/75 |

OTHER PUBLICATIONS

Dynamic Modeling of a Mobile Air Conditioning Compressor and Condenser from Actual Performance Data, L. A. Knobloch, C. R. Schenk and R. R. Crawford, ACRCTR-12, Jan. 1992. http://www.google.co.in/url?sa=t&rct=j&q=&source=web&cd=1&ved=0CCMQFjAA&url=http%3A%2F%2Fwww.ideals.illinois.edu%2Fbitstream%2Fhandle%2F2142%2F9701%2FTR012.pdf&ei=WsI0UluCOMrVrQer24HIDg&usg=AFQjCNGKeJ6yG6bu?7b2D0JdQap9Ggc?tQ&cad=rja (82 pages).

Office Action in related Chinese Patent Application No. 201410041197.3 dated May 8, 2017.

\* cited by examiner

COOLEST A/C DISCHARGE TEMPERATURE FOR ALL OPERATING CONDITIONS

BACKGROUND

Air conditioning (A/C) evaporator cores may ice up in certain conditions, as water from humid air may condense when the air is being cooled. To prevent icing of the evaporator, the temperature in the evaporator core is prevented from falling below a certain temperature. A vehicle may be equipped with a temperature sensor to read the evaporator core temperature, where the sensor output may be utilized in accordance with settings of a climate control module (CCM) to cycle the compressor. These settings that cause the control module to turn off and on the compressor may be referred to as setpoints. The compressor setpoints may be set to provide a balance between maximum cooling performance and prevention of the evaporator core from freezing (icing).

Heating, ventilation and air conditioning (HVAC) systems that prevent evaporator core icing typically have only one set of compressor on and off setpoints. Thus, to reduce the risk of evaporator core freezing, the HVAC system may utilize a setpoint higher than would be necessary in all conditions, thereby compromising A/C performance in situations where a lower setpoint may be possible without icing.

SUMMARY OF THE INVENTION

A method may include and an automatic climate controller device may be configured to perform operations including identifying, by an automatic climate controller device, an operating zone of the climate control system according to at least two input factors; identifying a discharge temperature of the climate control system; determining, based on the operating zone and the discharge temperature, whether to perform at least one override action to override a climate control system setting to reduce the possibility of evaporator core icing; and adjusting an evaporator set point according to the at least one override action to reduce the discharge temperature. The input factors may include evaporator temperature and cabin relative humidity. The actions may include to increase blower speed and to increase use of recirculated air.

DETAILED DESCRIPTION

Figure 1:
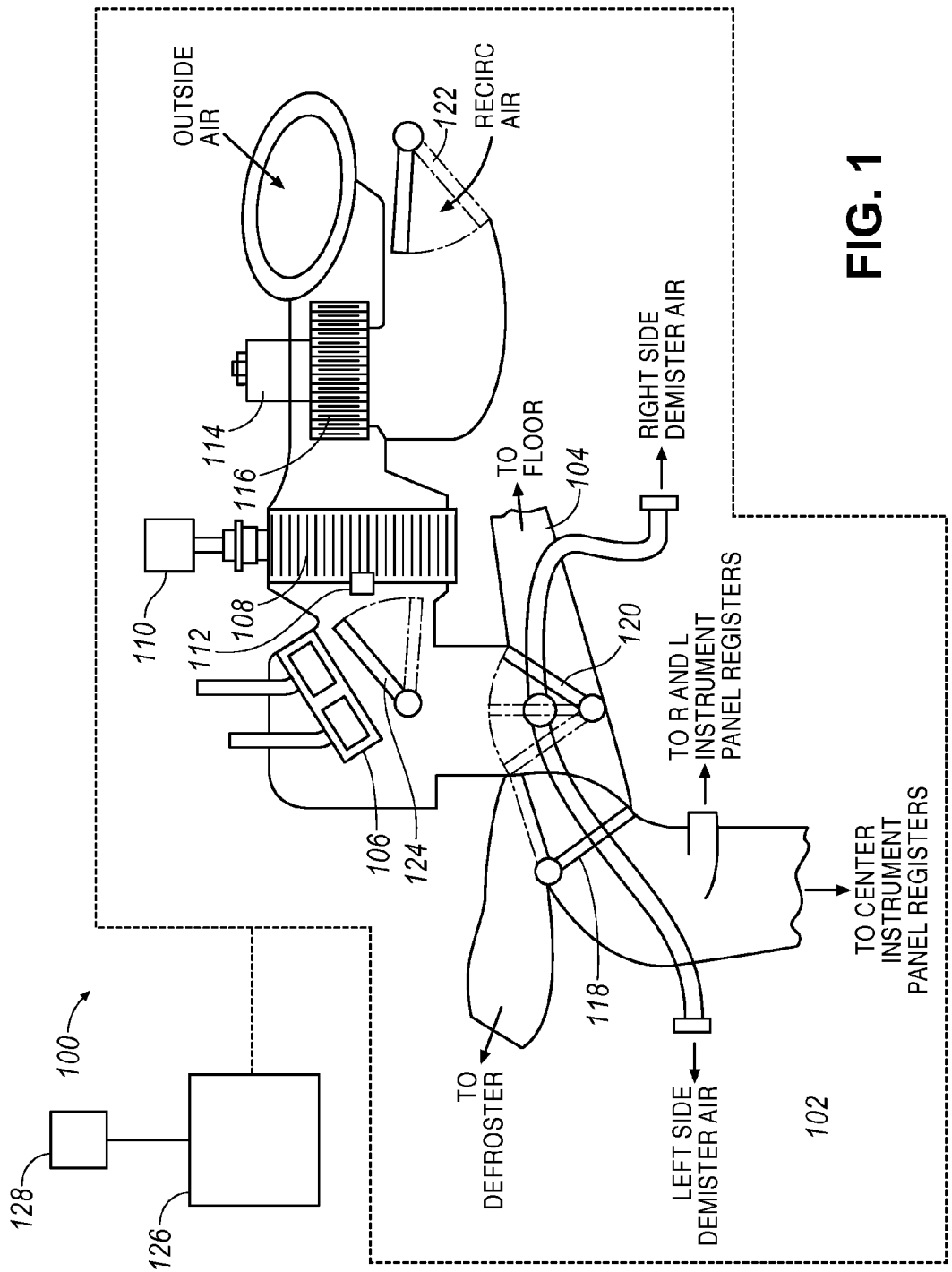
FIG. 1 illustrates an exemplary schematic view of a vehicle climate control system for environmental management of a vehicle.

Vehicle HVAC systems may be tested at relatively high ambient temperatures, based on an assumption that if the system performs well under hot conditions, then cooler conditions will only provide better cooling. However, this assumption may not necessarily be true.

In environments having relatively high ambient temperatures outside the vehicle, the A/C compressor may run freely at maximum capacity without constraint from evaporator thermistor set points. However, at lower ambient temperatures, evaporator thermistor set points may be required to mitigate core icing conditions. For example, evaporator thermistor set points may be used to cycle the compressor off when the core temperature reaches a low temperature set point at which icing may occur, and cycle the compressor on when the core temperature reaches above a high temperature set point. This cycling of the compressor logically results in the core temperature increasing during off portions of the duty cycle and decreasing during on portions of the duty cycle. This variation in core temperature may cause warmer discharge temperature on average than would be observed were the compressor working full-time. As a result, while a vehicle cooling system may perform well in warm conditions, due to compressor cycling the system may provide warmer output and poorer cooling performance in cooler conditions.

In addition to ambient temperature (i.e., the temperature of airflow passing over the evaporator) core, other factors may contribute to the likelihood of evaporator core icing and therefore require compressor cycling. For example, the relative humidity of airflow passing over the core may affect core icing, as humid air may cause increased condensation on the core. As another example, a lower quantity of airflow passing over the core may have a reduced warming effect on the core as compared to a higher amount of airflow over the core.

An improved HVAC control strategy may be implemented to eliminate or reduce the cycling of the compressor, providing for a lower average cycled discharge temperature and thereby improving A/C system performance. Based on received inputs, the improved HVAC control strategy may utilize a control heuristic to identify an operating zone related to what combination of input factors the vehicle is experiencing. An exemplary combination of input factors may include determining a combination of high and low temperature and high and low relative humidity that the vehicle is experiencing.

Based on the identified operating zone, the improved HVAC control strategy may utilize the control heuristic to identify override actions that may be performed to eliminate or reduce the cycling of the compressor. For example, the HVAC control strategy may increase the amount of recirculated air from the passenger cabin that is used as an input to the system. Because the recirculated air may be drier than the outside air, a switch to recirculated air may reduce the humidity content of the air passing over the evaporator, thereby reducing the risk of icing and allowing for the core to operate safely at a lower temperature. As another example, the HVAC control strategy may further provide for adjusting the evaporator load to prevent cycling. For instance, if the evaporator load is kept suitably high by increasing the blower speed to provide additional airflow over the core, then the compressor will not freeze and therefore will not be required to cycle. Moreover, the HVAC control strategy may determine that based on conditions the evaporator set points may be safely lowered (e.g., based on the overridden increased blower speed and/or switch to recirculated air), thereby providing a lower average cycled discharge temperature. Thus, by using the improved control heuristic to identify operating zones and provide appropriate override actions, the system may provide a lower average cycle discharge temperature and improved A/C system performance.

FIG. 1 illustrates an exemplary schematic view of a vehicle climate control system 100 for environmental management of a vehicle. The vehicle climate control system 100 may include air processing components configured to heat, cool, and otherwise process air according to an HVAC control strategy, as well as distribution components configured to distribute or otherwise direct the processed airflow to one or more zones of the passenger cabin 102 of the vehicle by way of associated ducting 104.

The air processing components may include air heating components, such as a heater core 106. The air processing components may also include air conditioning (A/C) components, such as an evaporator core 108 and a compressor 110. In some instances, the compressor 110 may be electrically driven, while in other instances the compressor 110 may be mechanically driven by a vehicle engine. The A/C components of the system 100 may also include an evaporator temperature sensor 112 configured to provide information representative of the temperature of the evaporator core 108, which may be used to selectively deactivate the compressor 110 under certain conditions, such as when the temperature of the evaporator core 108 drops below a predetermined value. This deactivation of the compressor 110 may be performed to aid in the prevention of freezing of the evaporator core 108 in certain conditions. The system 100 may also include fan components including, for example, a HVAC blower 114 and blower wheel 116 for generating airflow of the air being processed.

To control the distribution of the airflow through the ducting 104, the air distribution components may include an arrangement of airflow doors including, for example, a panel-defrost door 118 facilitating the selective direction of airflow to the panel/defrost vents, a floor-panel door 120 facilitating the selective direction of airflow to the floor vents, and an outside recirculated air door 122 facilitating the selection of passenger cabin 102 or outside air as input to the HVAC system. In some cases, the recirculated air door 122 may have only open and closed positions to select either outside air or cabin air, but on other cases the recirculated air door 122 may provide for intermediate positions to provide a blending of outside and cabin air. A temperature control blend door 124 may also be included to provide for hot air mixing to obtain a desired target discharge air temperature to be exited from the system 100 into the passenger cabin 102. To facilitate the selective distribution of air, one or more of the doors 118, 120, 122 and 124 may be positioned as open, partially open, or closed. In some cases, one or more of the doors 118, 120, 122 and 124 may be driven by vacuum motors that provide for positioning of the doors according to amount of vacuum, e.g., by using vacuum, partial vacuum and no vacuum positions. In some cases, one or more of the doors 118, 120, 122 and 124 may be driven by way of an electric servo motor to facilitate the selective positioning of the doors.

The system 100 may further include an EATC module such as controller 126 configured to control the operation of the system 100. The controller 126 may be configured to receive inputs from a vehicle occupant via the climate control head 128 to facilitate the occupants of the vehicle in selecting environmental conditions in the vehicle. The climate control head 128 may be included as part of a vehicle instrument panel, and may be configured to allow a vehicle occupant to manually control the HVAC functions, and in some cases, override an automatic operation of the system 100. As some examples, the climate control head 128 may include controls such as: a mode selector configured to allow an occupant to choose where airflow will be directed by the panel-defrost door 118 and floor-panel door 120, a temperature selector configured to allow an occupant to select a preferred cabin air temperature, an A/C control to allow an occupant to manually select or deselect use of the compressor 110, a recirculation selector to allow for control of the recirculated air door 122 to select recirculation of cabin air, fresh air, or some combination thereof, and a fan selector configured to allow an occupant to choose fan speed settings for the HVAC blower 114 and blower wheel 116.

Figure 2:
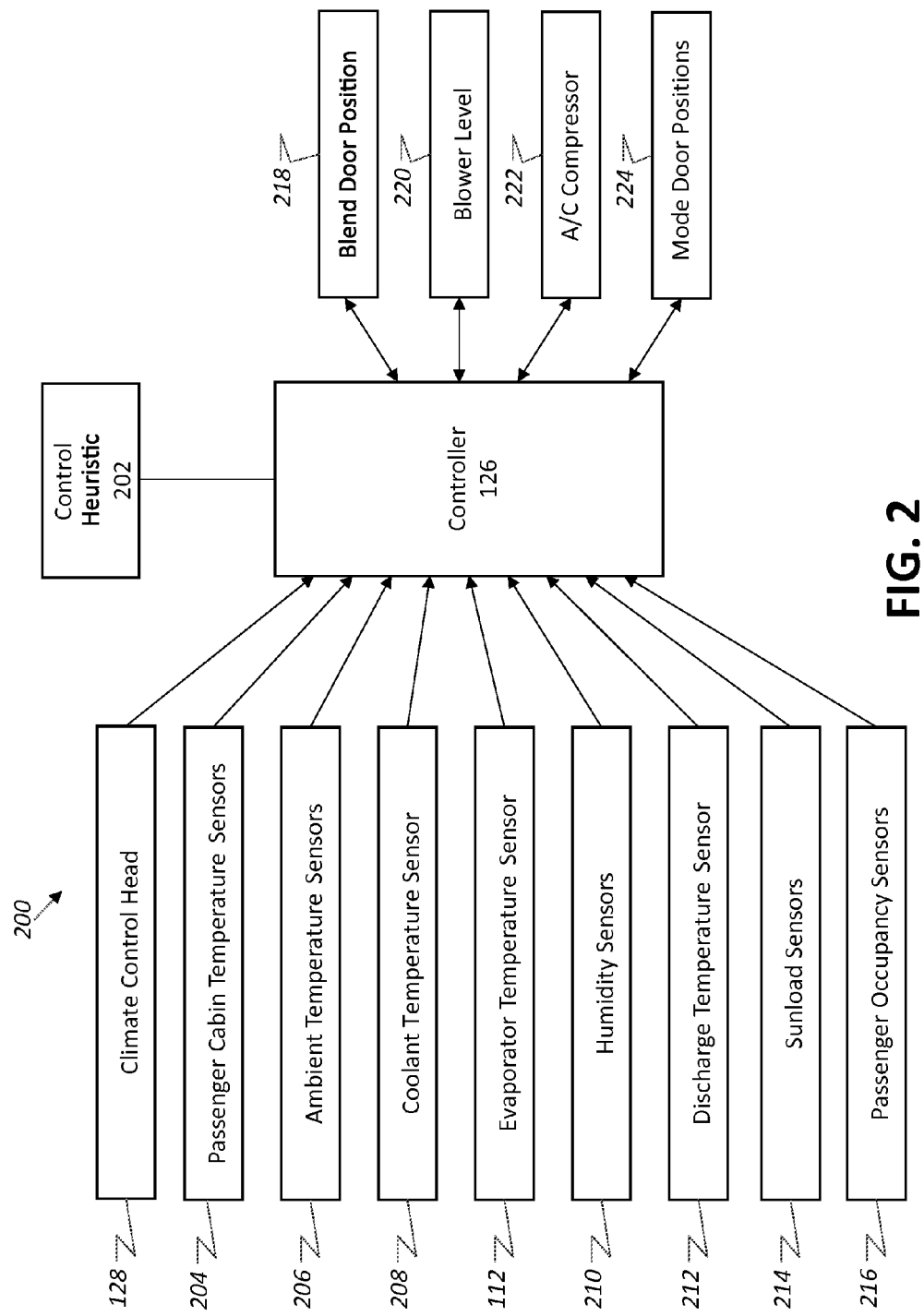
FIG. 2 illustrates an exemplary block diagram of a control system of a vehicle climate control system for implementing an improved HVAC strategy configured to provide a lower average cycled discharge temperature.

FIG. 2 illustrates an exemplary block diagram of a control system 200 of a vehicle climate control system 100 for implementing an improved HVAC strategy configured to provide a lower average cycled discharge temperature.

The exemplary control system 200 may utilize the controller 126 to receive inputs from a vehicle occupant via climate control head 128, and to generate commands to control aspects of the vehicle climate control system 100, such as air heating components, air conditioning components, fan components, doors and other air distribution components. For example, the control system 200 may utilize the controller 126 to provide a blend door position 218 output to control the positioning of the temperature control blend door 124, a blower level 220 output to control fan components such as the HVAC blower 114, an A/C compressor 222 output to control the temperature cycling of the evaporator core 108, and a mode door positions 224 output to control the positioning of the mode doors 118, 120, and 122.

With respect to the sensors, the controller 126 may be configured to receive inputs from: one or more passenger cabin temperature sensors 204 configured to provide information representative of interior cabin temperature, ambient temperature sensors 206 configured to provide information representative of ambient (outside) air temperature an engine coolant temperature sensor 208 configured to provide information representative of the engine coolant temperature for use in determining available heat (or for a vehicle having a heat pump heating system, another type of sensor such as a cabin condenser temperature sensor), an evaporator temperature sensor 112 configured to provide information representative of the temperature of the evaporator core 108, humidity sensors 210 configured to provide information representative of the relative humidity of the passenger cabin, discharge air temperature sensors 212 configured to provide information representative of the discharge air temperature into the passenger cabin 102, sun-load sensors 214 configured to utilize photodiodes or other elements to provide information related to sun-loading and direction as it relates to various zones of the vehicle, and passenger occupancy sensors 216 configured to provide information related to which seats of the vehicle are occupied.

The HVAC strategy may use the control heuristic 202 to perform override actions in order to provide for a lower average discharge temperature. One technique that may be used may be to reduce the evaporator core moisture content by staying in recirculate mode for A/C operation, with ambient air based recirculation where it is in recirculation for ambient temperature above a threshold (e.g., approximately 24° C.). Staying in recirculation mode may provide the evaporator core with discharge air that is cooler than outside air, but it may also be drier than the outside air which may facilitate dropping of the cabin relative humidity. Moreover, under cooler and drier air conditions, the likelihood of icing is lower and so a reduced evaporator core set point may be possible as compared to the use of more humid outside air.

Another technique that may be used to provide evaporator load control is adjustment of the speed of the HVAC blower 114. For example, an increased blower speed may provide sufficient airflow to increase evaporator load and therefore make evaporator core icing less likely due to the increased heat exchange. If the load is kept sufficiently high in the system, the compressor will not be allowed to cycle resulting in cooler air output.

The HVAC strategy may further use the control heuristic 202 to adjust an evaporator set point according to sensor inputs (e.g., discharge temperature, cabin relative humidity, evaporator temperature, etc.) to provide a lower evaporator set point if conditions permit. For instance, based on performing other override actions, such overriding recirculated air and blower speed settings, the evaporator set point settings may be overridden to be lower, thereby providing cooler discharge air.

The controller 126 may be programmed with an HVAC control strategy utilizing the control heuristic 202 to determine operating zones that include criteria determined according to the sensors to divide conditions into different categories requiring different override actions. Exemplary operating zones may include factors such as HVAC mode, HVAC blower speed, ambient conditions, and vehicle-specific variables. In some examples, the determination of the operating zones may be implemented in software that resides in a memory of the controller 126 and that is executed by a processor of the controller 126. Based on the operating zones, the control system 200 may further utilize the controller 126 to provide one or more of the override actions such as to override the blend door position 218, blower level 220, and evaporator set points. As explained in further detail with respect to FIGS. 3 and 4, the controller 126 may utilize an operating zone-based solution to classify A/C operating modes, and use the operating zone determination to select override actions to lower average cycle discharge temperature, thereby improving A/C system performance.

Figure 3:
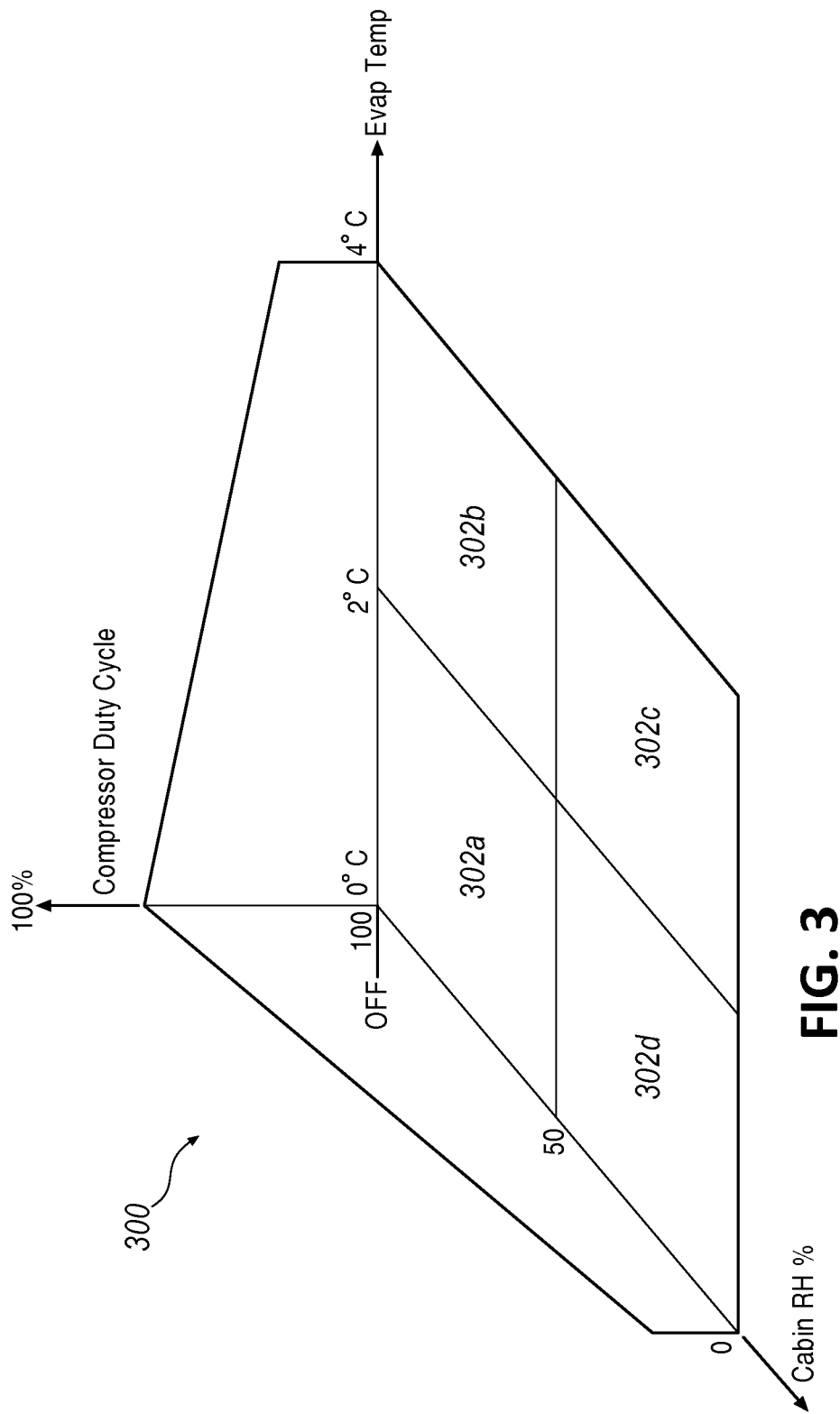
FIG. 3 illustrates an exemplary mapping of a plurality of exemplary operating zones.

FIG. 3 illustrates an exemplary mapping 300 of a plurality of exemplary operating zones 302. As illustrated, to determine which strategies to implement to provide for lower average cycled discharge temperature, the HVAC strategy may divide environmental conditions into the operating zones 302 according to a combination of low or high relative cabin humidity in combination with low or high ambient temperature. The HVAC system 100 may accordingly move the cabin conditions from a less comfortable zone to a more comfortable zone. For example, the HVAC strategy may endeavor to move the cabin conditions into operating zone 302d. To accomplish the goal, the HVAC strategy may further provide for different override actions according to the operating zone 302 to best achieve lower average cycle discharge temperature without core icing. While FIG. 3 illustrates four exemplary operating zones 302 determined according to ambient temperature and cabin relative humidity factors, the exemplary approach may be applicable to other factors as well.

With respect to the four zones, operating zone 302a may be characterized by a higher cabin relative humidity (e.g., >50% relative humidity) and a lower evaporator core temperature (e.g., <2° C.). This may be a result of a higher ambient temperature and a higher humidity environment. To address these conditions, operating zone 302a may be associated with a relatively high compressor duty cycle. Operating zone 302a may be susceptible to icing conditions due to the lower evaporator temperature, higher relative humidity, and relatively high load and duty cycle actions that may be used to bring the humidity down to a more comfortable level. With a relatively higher duty cycle, the average discharge temperature may fall within acceptable limits for passenger comfort, at least until the A/C system begins to cycle.

To address the conditions of operating zone 302a, the HVAC strategy may set the evaporator set points according to existing procedures, such as in a variable manner according to ambient temperature. Moreover, the HVAC strategy may further modulate the recirculated air door 122 to select a source of air with a humidity level required to maintain a relatively high discharge blower speed (e.g., max A/C) without core icing. Zone 302a may migrate into zone 302d, as the humidity of the cabin air is brought down to a more acceptable level.

Operating zone 302b may be characterized by higher cabin relative humidity (e.g., >50% relative humidity) and higher evaporator core temperature (e.g., >2° C.). The conditions of operating zone 302b may cause a moderate load and moderate duty cycle. In operating zone 302b, the possibility of icing may be correspondingly lower due to the higher temperature, which may also result in a relatively higher discharge temperature as compared to the zone 302a.

To address the conditions of operating zone 302b, the HVAC strategy may set the evaporator set points to be high enough to prevent icing yet maintain a higher duty cycle, thus maintaining a lower average effective discharge temperature. Moreover, the HVAC strategy may further modulate the recirculated air door 122 to select a source of drier available air (with lowest relative humidity) to pass over the evaporator core. This source may either be the passenger cabin, the outside air, or a blend of the two depending on circumstances.

Operating zone 302c may be characterized by lower cabin relative humidity (e.g., <50% relative humidity) and higher evaporator core temperature (e.g., >2° C.). The conditions of operating zone 302c may cause relatively low load and duty cycle, but as a consequence may have a relatively high average discharge temperature. Icing is relatively unlikely in the operating zone 302c due to the low duty cycle.

To address the conditions of operating zone 302c, the HVAC strategy may set the evaporator set points relatively low because icing is correspondingly relatively unlikely. Moreover, the HVAC strategy may further modulate the recirculated air door 122 to select the source of drier available air (lowest relative humidity) to pass over the evaporator core. This source may either be the passenger cabin or the outside air, depending on circumstances.

Operating zone 302d may be characterized by lower cabin relative humidity (e.g., <50% relative humidity) and lower evaporator core temperature (e.g., <2° C.). The conditions of operating zone 302d may cause a moderate load and moderate duty cycle. Icing is also relatively unlikely in the operating zone 302d in part because of the low relative humidity.

To address the conditions of operating zone 302d, the HVAC strategy may perform similar to as discussed above with respect to zone 302c, including for example to set the evaporator set points relatively low because core icing is relatively unlikely and to modulate the recirculated air door 122 to select a source of relatively dry air to pass over the evaporator core.

Figure 4:
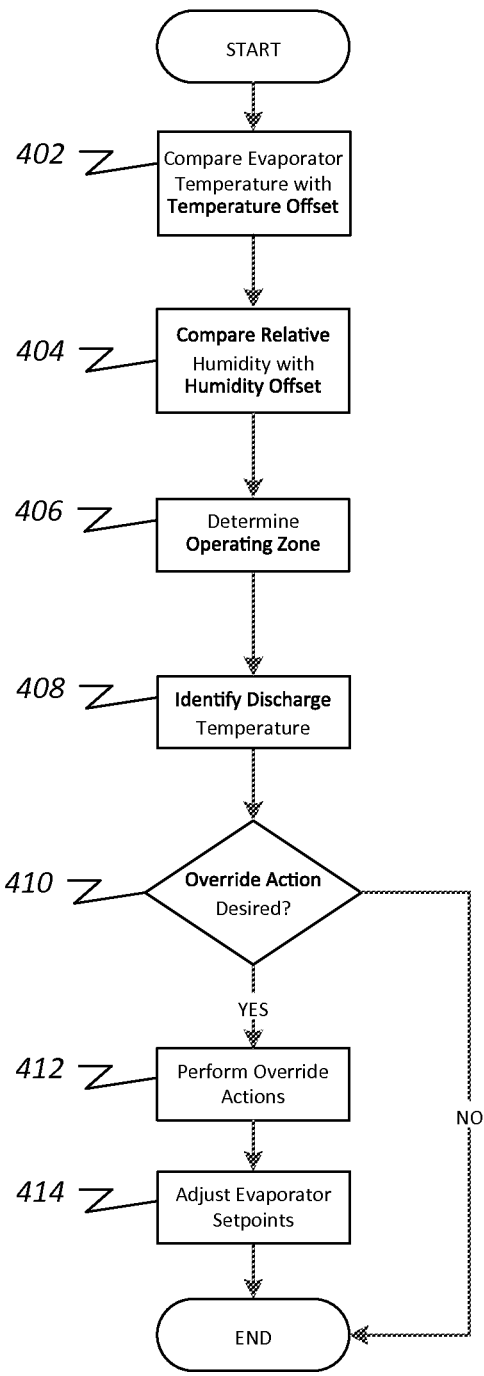
FIG. 4 illustrates an exemplary process for implementing an HVAC strategy in a vehicle climate control system to provide a lower average cycled discharge temperature.

FIG. 4 illustrates an exemplary process 400 for implementing an HVAC strategy in a vehicle climate control system to provide a lower average cycled discharge temperature. The process 400 may be performed by various devices, such as by a controller 126 utilizing the control heuristic 202 in combination with the components of the HVAC system 100. By utilizing the control heuristic 202, the HVAC control strategy may improve the performance of the A/C system, while at the same time avoiding the risk of evaporator 110 icing.

In block 402, the controller 126 compares evaporator temperature with a temperature offset. For example, the controller 126 may receive information from the evaporator temperature sensor 112, and may compare the information with a predetermined temperature offset. In some examples, such as illustrated in the exemplary mapping 300 of factors into a plurality of exemplary operating zones 302 discussed above, the predetermined temperature offset may be set to approximately 2° C.

In block 404, the controller 126 compares cabin relative humidity with a humidity offset. For example, the controller 126 may receive information from one or more humidity sensors 210, and may compare the information with a predetermined humidity offset. In some examples, such as illustrated in the exemplary mapping 300 of A/C factors into a plurality of exemplary operating zones 302 discussed above, the predetermined humidity offset may be set to approximately 50% relative cabin humidity.

In block 406, the controller 126 determines an operating zone 302 for the vehicle climate control system. For example, based on the input factors such as the results of the comparison of the evaporator temperature with the temperature offset and the comparison of the cabin relative humidity with the humidity offset, the controller 126 may identify an operating zone 302 corresponding to the operating conditions for the vehicle climate control system in terms of temperature and humidity.

In block 408, the controller 126 identifies a discharge temperature. For example, the controller 126 may receive information from one or more discharge temperature sensors 212. In other examples, if discharge temperature sensors 212 are unavailable, then the controller 126 may receive information from one or more other sensors to estimate the discharge temperature, such as from passenger cabin temperature sensors 204, evaporator temperature sensors 112, and/or information about the current HVAC mode (e.g., panel, floor, etc.).

In decision point 410, the controller 126 determines whether an override action is desired to lower the discharge temperature. For example, the controller 126 may determine that the discharge temperature is sufficiently low to provide for passenger comfort. For example, if the discharge temperature is below a predetermined comfort temperature threshold (e.g., <10° C.), then the controller 126 may determine that no override actions are required. As another example, the controller 126 may determine that, based on the operating zone 302, that no override actions may be available, or that any available override actions may have too high of a likelihood of causing core icing. If the controller determines that an override action is desired, control passes to block 412. Otherwise, the process 400 ends.

In block 412, the controller 126 performs an override action to override one or more controller 126 outputs to lower the discharge temperature based on the operating zone 302. For example, the controller 126 may override the blend door position 218 to reduce the evaporator core moisture content by staying in recirculate mode for A/C operation, with ambient air based recirculation where it is in recirculation for ambient temperature above a threshold (e.g., approximately 24° C.). Staying in recirculation mode may provide the evaporator core with discharge air that is cooler than outside air, but it may also be drier than the outside air which may facilitate dropping of the cabin relative humidity. As another example, the controller 126 may override the blower level 220 through adjustment of the speed of the HVAC blower 114, as an increased blower speed may provide sufficient airflow to increase evaporator load and therefore make evaporator core icing less likely due to the increased heat exchange.

In block 414, the controller 126 adjusts evaporator set points according to the override actions. For example, the controller 126 may override and lower the evaporator set points according to the overridden blend door position 218 to reduce the evaporator core moisture content or according to the overridden blower level 220 adjustment of the speed of the HVAC blower 114. After block 414, the process 400 ends.

Computing devices such as the controller 126 generally include computer-executable instructions executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. An application configured to perform the operations of the controller 126, such as the control heuristic 202, may be one such computer program product and may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   identifying, by a controller, an operating zone of a climate system defined by evaporator temperature and cabin relative humidity;
   determining, based on the operating zone and an air discharge temperature of the system, whether to perform an override action to override a setting of the system to reduce evaporator core icing; and
   adjusting an evaporator set point according to the override action to reduce the discharge temperature.

2. The method of claim 1, further configured to perform operations comprising:
   comparing whether the evaporator temperature of climate system exceeds an evaporator temperature offset temperature; and
   comparing whether the cabin relative humidity exceeds a relative humidity offset amount of humidity.

3. The method of claim 1, wherein the override action includes at least one of increasing blower speed and increasing flow of recirculated air.

4. The method of claim 2, wherein the evaporator temperature offset temperature is 2 degrees Celsius and the relative humidity offset amount is 50% relative humidity.

5. The method of claim 1, further comprising controlling a variable recirculated air door having at least one intermediate position between open and closed.

6. The method of claim 1, further comprising forcing compressor cycling when the discharge temperature is less than a predefined threshold.

7. An automatic climate controller device configured to perform operations comprising:
   identifying, by the automatic climate controller device, an operating zone of a climate control system defined by factors including evaporator temperature and cabin relative humidity;
   identifying a discharge temperature of the climate control system;
   determining, based on the operating zone and the discharge temperature, whether to perform at least one override action to override a setting of the climate control setting to reduce evaporator core icing; and
   adjusting an evaporator set point according to the at least one override action to reduce the discharge temperature.

8. The automatic climate controller device of claim 7, further configured to perform operations comprising:
   comparing whether the evaporator temperature of a climate control system exceeds an evaporator temperature offset temperature; and
   comparing whether the cabin relative humidity exceeds a relative humidity offset amount of humidity.

9. The automatic climate controller device of claim 7, wherein the at least one override action includes at least one of increasing blower speed and increasing flow of recirculated air.

10. The automatic climate controller device of claim 8, wherein the evaporator temperature offset temperature is 2 degrees Celsius and the relative humidity offset amount is 50% relative humidity.

11. The automatic climate controller device of claim 7, further configured to perform operations comprising controlling a variable recirculated air door having at least one intermediate position between open and closed.

12. The automatic climate controller device of claim 7, further configured to perform operations comprising forcing compressor cycling when the discharge temperature is less than a predefined threshold.

13. A system, comprising:
    an air conditioning subsystem; and
    a climate controller device configured to perform operations comprising:
       identifying an operating zone of a climate system defined by factors including evaporator temperature and cabin relative humidity;
       identifying a discharge temperature of the climate system;
       determining, based on the operating zone and the discharge temperature, whether to perform at least one override action to override a climate system setting to reduce the possibility of evaporator core icing; and
       adjusting an evaporator set point according to the at least one override action to reduce the discharge temperature.

14. The system of claim 13, wherein the climate controller device is further configured to perform operations comprising:
 comparing whether an evaporator temperature of a climate system exceeds an evaporator temperature offset temperature; and
 comparing whether cabin relative humidity exceeds a relative humidity offset amount of humidity.

15. The system of claim 13, wherein the at least one override action includes at least one of increasing blower speed and increasing flow of recirculated air.

16. The system of claim 14, wherein the evaporator temperature offset temperature is 2 degrees Celsius and the relative humidity offset amount is 50% relative humidity.

17. The system of claim 13, wherein the climate controller device is further configured to perform operations comprising controlling a variable recirculated air door having at least one intermediate position between open and closed.

18. The system of claim 13, wherein the climate controller device is further configured to perform operations comprising forcing compressor cycling when the discharge temperature is less than a predefined threshold.

\* \* \* \* \*